United States Patent [19]

Reid, Jr.

[11] 4,197,468
[45] Apr. 8, 1980

[54] ELECTRICAL DEMAND CONTROLLER

[76] Inventor: Frank P. Reid, Jr., 84-33 90th St., Woodhaven, N.Y. 11421

[21] Appl. No.: 955,320

[22] Filed: Oct. 27, 1978

[51] Int. Cl.² .............................................. H02J 3/00
[52] U.S. Cl. ..................................... 307/38; 361/191; 340/147 LP
[58] Field of Search ........................... 307/41, 38, 31; 315/320; 340/147 LP; 361/191

[56] References Cited

U.S. PATENT DOCUMENTS

| | | | |
|---|---|---|---|
| 2,311,438 | 2/1943 | Hoyt | 307/41 |
| 2,712,101 | 6/1955 | Salati | 307/38 |
| 2,971,135 | 2/1961 | Ebert | 307/38 |
| 2,981,869 | 4/1961 | Balint | 307/38 |
| 3,066,227 | 11/1962 | Rooney | 307/34 |
| 3,311,795 | 3/1967 | Eilbert | 307/38 |
| 3,339,079 | 8/1967 | Kessler | 307/29 |
| 3,359,426 | 12/1967 | Burr | 307/38 |
| 3,443,114 | 5/1969 | Morrison | 307/41 |
| 4,066,913 | 1/1978 | Manning et al. | 307/38 |

*Primary Examiner*—L. T. Hix
*Assistant Examiner*—James L. Dwyer

[57] ABSTRACT

In a preferred embodiment, a plurality of interconnected demand controllers of the invention, each demand controller being connected to and controllable of one or more different machines (loads) controlled thereby a plurality of the interconnected demand controllers being controlled by others of the interconnected demand controllers whereby a priority of running of particular machines and of non-running of other machines may be predetermined and maintained automatically, and also there being safeguards against intermittent inconsequential variations in activating currents and/or short-term cessations thereof not ordinarily intended to change the sequence or preference, each controller being basically inclusive of a transformer with the load-switch on the high-voltage side as controlled by switch coils thereof of a relay-type located on the low-voltage side in electrical flow series with a normally-closed low-voltage switch of a relay type controlled by other relay switch coils in another different electrical circuit preferably of low voltage, and preferably having a delay mechanism associated with the other relay switch coils delaying initial activation, as well as also preferably having an additional delay mechanism also associated with the other relay switch coils temporarily maintaining activation subsequent to cessation of an activating signal.

7 Claims, 5 Drawing Figures

ELECTRICAL DEMAND CONTROLLER

This invention is directed to a demand controller for selectivity in the running of a plurality of machines competing for the same electrical power in either time or quantity of energy available.

BACKGROUND TO THE INVENTION

Prior to the present invention, there has existed a need by small manufacturers and as well by small businesses to maintain some or improved control over the number of machines running concurrently and/or the total number of machines permitted to run during any predetermined set period of time. Also, there has been the need to stagger the running of machines over a longer period of time, as contrasted to permitting too many run concurrently over a short period of time. Such matters are very important in the power company computation of total charge for the amount of electrical current used, such that by selectively permitting solely a few machines to run in according to predetermined priority, and by preventing concurrent running beyond predetermined limits, as regards a plurality of competing machines all driven by electrical power, substantial savings in operating costs may be made. While there have previously been some few devices serving some one or more of these functions, such machines have had disadvantages of not serving all such functions and/or more importantly such machines have been very complicated in their design and operation and parts thereof, resulting in costs of purchase far above the maximum limits that can be afforded by most of these small manufacturers and/or small business users of electrical energy. The importance of such control of operating costs such as cost of electrical power, has grown in magnitude recently by the notorious increases in costs of electrical energy which threaten the very economic existence of many of these manufacturers and/or small businesses which cannot afford to pay unlimited charges for electrical power total usage. Discussion of typical non-anticipating prior art is as follows.

U.S. Pat. No. 2,311,438 discloses a relay arrangement for the predetermined sequential operation of several pieces of electrical equipment with provision for the manual over-ride of the sequence if desired. The sequence can be changed by use of a switch at each mechanism location. It is used where several pieces of machinery are required to satisfy the demands of the operating means. For example, multiple water pump installation to maintain system water pressure. Where the conditions are satisfied, the equipment controlled shuts down in the opposite sequence form start-up. It requires a separate source of power to operate the invention thereof, the purpose being not the same nor are the results the same as that of the present Applicant's invention.

U.S. Pat. No. 2,712,101 discloses a relay interlock circuit—having priority levels which are assigned to relays shown with individual momentary switches- relay selected by a switch "locks" itself on and interrupts "lock-in" circuit path for all relays of lower "priority". As shown, it requires two separate sources of power. No means is shown for disabling top priority relay once it is energized. If lower priority relays are actuated while higher priority relays are "locked in", such lower priority relays will oscillate while attempt is made to actuate. The circuit has only one mode of operation for the disclosed invention thereof, but the purpose and the results are not the same as that of the invention of the present invention by the present Applicant.

The U.S. Pat. No. 3,066,227 device reduces electrical demand by dropping selected loads during the operation of a single, preferred "indispensable" load-operating means of preferred load (thermostat, switch, etc.); it operates a relay which, when operated interrupts power to another relay which drops the "dispensable" load or loads; the first relay also operates a third relay which turns-on the "indispensable" load. When its operating means returns to its original state, its system reverts to its original condition. The patent shows just two levels of priority and shows no mechanism to change the mode of operation, nor provision for expansion of the system and requires a separate source of power to operate the first relay—no mechanism being shown to overide the system, and the scope of the disclosed invention thereof is very limited, while the utility is somewhat analagous to that of the present invention. Also, the patent's device does not provide for any central monitoring of power consumption.

U.S. Pat. No. 3,339,079 discloses sequential addition and removal of generators on line, in response to load conditions, to maintain the smallest number of generators operating, each at close to maximum output level. It requires central monitoring of power consumption and a separate source of power to operate computer-like cuitry to make decisions and action them. Sophisticated and complicated and complicated and expensive mechanisms and structure are disclosed, as well as the purpose and method(mechanism) of operation not being the same as that of the present invention.

U.S. Pat. No. 3,359,426 discloses a relay circuit which prevents simultaneous operation of several loads. Actuation (by mechanism of momentary contact normally-open switch) results in shut-down of any previously actuated circuit. Attempt to activate more than one device results in shut-off of both. It requires separate source of power, as with prior patents. Only one mode of operation is disclosed, and the purpose is not the same, nor the result, as compared to the present invention, the patented device being apparently intended to operate related loads within a same common machine.

U.S. Pat. No. 3,443,114 discloses a relay circuit designed to prevent simultaneous operation of two or more loads, by incorporating timers to allow complete (timed) cycle; if a second load mechanism calls for operation, a second such load will wait until the first load finishes its cycle before beginning. At that point, the first device will then also wait until the second device's cycle is complete. There is also shown a "series" connection making use of solely one operating mechanism for two or more controlled loads, and requires also a separate source of power to operate timers. Thus, again, the purpose and results of the disclosed mechanism is not the same as that of the present invention.

U.S. Pat. No. 3,489,913 relates to an improvement to the inventions of U.S. Pat. No. 3,133,202 and U.S. Pat. No. 3,291,998; both previous patents monitor the power line to detect level of power consumption and, based on the level, sequentially switch on or off a number of loads (in a fixed priority of sequence) to prevent high peak consumption of electricity. The improvement shows an additional unit (cycler) with patch-cord connection to the original stabilizer, permitting a number of loads to share any given priority level by rotating the available time among the several loads. There is required a central monitoring of power consumption, and required separate power supply to operate the cycler which is basically a timer which steps through all possible input-output combinations repeatedly. There is no provision for individual over-ride from outside control, and is very complex in operation as well as being of a different mechanism of operation, even though the purpose of the invention thereof is somewhat the same as that of the present invention.

U.S. Pat. No. 3,538,391 discloses a load control sequencing system to prevent high peaks of electrical consumption. It uses central monitoring of total electrical consumption; when consumption rises, the connected loads are sequentially disconnected in a fixed ored of priority. Loads are sequentially reconnected in the reverse order of priority. It is a solid state system, and requires a separate source of power to a central control panel, and is a complex mechanism more suitable for large electrical installations; multi-position switch allows for changing of consumption level at which action of the system begins. While the results is somewhat the same, the mechanism or method of achieving the ends is totally different from that of the present invention.

U.S. Pat. No. 3,714,453 discloses a load control system similar to that of U.S. Pat. No. 3,538,391 except that central monitoring is by a modified demand or watt meter similar to the type used by the utility companies. It is a very complex system, using computer-like elements to make decisions based not only on the position of the demand meter needle, but also on the rate and direction of its motion; it is said to be able to "anticipate" what action should be taken to prevent high peak consumption. Very complicated mechanism which is expensive, is disclosed, providing for seasonal adjustment for the point at which action is taken. Such is better suited for large installations, not being the same as the present invention.

U.S. Pat. No. 3,769,520 discloses a load control system similar to U.S. Pat. No. 3,538,391 except providing mechanism for automatic adjustment of consumption level at which action takes place. Adjustment takes place in response to the needs of controlled equipment and/or central monitoring device. The centralized system requires separate source of power, and the mechanism is expensive and complex, more suited for large installations, and the mechanism being totally different from that of the present invention.

U.S. Pat. No. 3,814,947 discloses a "flip-flop" for alternately energizing of two separate loads (incandescent lamps). It depends upon changing impedance of the load due to the energization. It requires momentary interruption of power supply for reversal to take place. Purpose different from that of the present invention, it would have no utility for the present invention.

U.S. Pat. No. 3,872,371 discloses constant total power supply for several loads. Decreasing power delivered to one load permits increased power to be delivered to remaining loads from a common power source. Purpose of the patented invention is different and the results different and the mechanism different from that of the present invention.

U.S. Pat. No. 4,066,913 discloses the same as U.S. Pat. No. 3,066,227, except providing for more than two levels of "priority". No mechanism is provided for changing which loads are connected to which priority level. Once built, it is difficult to modify or expand. It uses a separate source source of power, and uses a central control box. In operation, the highest priority load in operation shuts-off all lower priority equipment. There is no provision for override. While the purpose and result (utility) appear to be substantially the same as for the present invention, the mechanism and complexity are much more complicated and expensive than for the present invention, the patented disclosed mechanism being better adapted for large company operation.

While there are other patents to circuitry that might superficially resemble that of the present invention, there is no analogy in utility and adaptation for Applicant's use; a major utility of the present invention arises from the use of basically simple and readily available equipment, and the simple design embodying the same, as hereinafter disclosed.

THE INVENTION

Accordingly, objects of the present invention include the an electrical demand controller of simple and inexpensive design and operation, accordingly of low cost of manufacture and sales price to the ultimate purchaser and user thereof.

Another object is to obtain an electrical controller of the type discussed in the preceding paragraph, for providing a combination of several of such controllers interconnected with one-another, each controller controlling or controllable of one or more loads, and for providing priorities and overrides and to the extent desired, for concurrent running of selected loads.

Another object is to obtain safety mechanism for preventing accidental unintended cutting-in and/or cutting-out of prefered loads when fluctuations in current or voltage, or intermittent momentary electrical currents of cessations thereof, occur.

Other objects become apparent from the preceding and follow disclosure.

One or more objects of the invention are obtained by the invention as disclosed herein, typically as set forth in the appended drawings intended to facilitate understanding of the invention but not to unduly limit the invention to merely the illustrative example, the invention including variations and modifications and substitution of equivalents within ordinary skill of the art.

Broadly the invention may be defined as a novel unit composed of a simple but unique combination of readily-available and uncomplicated electronic parts such as transistors and electromagnetic switches, time-delay switches and the like, located on high and low sides of a transformer and rectifier, adapted to be utilized for interconnecting different loads(power-requiring devices such as electrically-powered motors) in a manner by which preference and selectivity, priority and the like, as set-forth in preceding objects are obtained; more particularly, broadly there is an electrical demand controller device which includes one or more interconnected and interacting units, such as a first unit having a transformer, a normally-open relay-activatable first first switch, a first rectifier mechanism, a first relay switch-coils, and first and second circuitries, interconnected as hereafter noted. The transformer has high voltage inlet and low voltage outlet leads and has low voltage inlet and low voltage outlet leads, as in any conventional transformer. The rectifier mechanism has alternating current inlets and a direct current outlet as a part of the first circuitry, with the alternating current inlets connected operatively to the low voltage inlet and low voltage outlet leads. Typically, the rectifier mechanism is a bridge rectifier of conventional type. The first relay switch-coils are connected serially consecutively with a normally-closed relay-activatable second switch and with the second relay-activatable switch connected with inlet leads thereof in series with the direct current outlet. The first relay switch-coils are operatively connected to close the normally-open relay-activatable first switch when activated by current flowing therethrough. The second circuitry means provides for an independent flow of current independent of and from the first circuitry, but with the provision of intermittently interconnecting the two circuits by the switches as a part of the selectivity, priority and the like, by virtue of the naure of the interconnections of the circuitries. The second circuitry typically includes a second relay switch-coils as above-noted, connected in series within the second circuitry operatively to to open the normally-closed relay-activatable second switch adapted to break electrical circuit to the first relay switch-coils to thereby result in a return of the normally-open relay-activatable first switch to or to continue in the open state when the second relay switch-coils are activated by flow of electrical current therethrough.

In a more preferred embodiment, a second unit idential (for all essential features thereof) to the first unit, above-noted, is interconnected with the second relay switch-coils of the first unit in electrical series with the direct current outlet of the second unit adapted such that when the normally-open relay activatable first switch of the second unit is in a closed state, the normally-open relay-activatable first switch of the first unit returns to or is maintained in an open state.

In another preferred embodiment, whether with a single unit above-noted or with a second one or more units as above-described in the preceding paragraph, there is provided a first time-delay mechanism. The first time-delay mechanism typically includes a normally open first time-delay switch and a first time-delay activator. When the first time-delay activator is activated by electrical current flow thereto, the normally-open first time-delay switch is caused to close after a delay in time incurred by operation of the first time-delay activator. The first time-delay activator is connected in electrical parallel with the second relay switch-coils of the first unit. The normally-open first time-delay switch is connected in electrical series flow with the second relay switch-coils of the first unit, adapted such that electrical current flow through the second relay switch-coils of the first unit is controlled by said normally-open first time-delay switch, whereby short-period flow of electrical current to the first time-delay activator does not result in an opening of the normally-open first time-delay switch when the normally-open first time-delay switch is in a closed state.

In another preferred embodiment, whether with one or the other single units of the broadest type or modified preferred type as above-described, or whether with a second basic or modified unit as used in combination, there is provided what is for purposes of distinguishing from the first delay switch above-described, is termed a second time-delay switch and a second time-delay activator as a part of a second time-delay mechanism. connected to maintain activation signal for a predetermined minor period of time subsequent to cessation of electrical current flow thereto to thereby maintain in open state the second time-delay switch controlled by the second time-delay activator. The second time-delay activator is connected in electrical flow series with the second relay switch-coils of the first unit. The second time-delay switch is in electrical flow series with each of the direct current outlet of the first unit and the normally-closed relay-activatable second switch of the first unit. Thereby a mere temporary cessation of activating current or voltage for less than the predetermined minor period of time does not result in a premature closing of the normally-open relay-activatable first switch of the first unit.

In still another preferred embodiment, whether with one or the other of single units of the broadest type or modified preferred type as above-described, or whether with one or the other second basic or modified unit(s) as used in combination, there is provided a further adaptation in which the normally-closed relay-activatable second switch of the second unit is connected in electrical current-flow series between the direct current outlet of the second unit and the second relay switch-coils of the first unit, adapted such that passage of electrical current through the normally-closed relay-activatable second switch of the first unit ceases upon activation of the second relay switch-coils of the second unit.

In another preferred embodiment, a first unit-output lead is connected in down-stream electrical-flow series with the normally-closed relay-activatable second switch and the first unit-output lead being adapted for connection to a second relay switch-coils of another unit substantially identical (for all necessary purposes) to the first unit.

In another preferred embodiment, a first unit-input lead to the second circuitry is provided to and through a normally-closed relay-activatable third switch connected to be activated by and upon activation of the first relay-switch coils; the first unit-input lead is further connected as an output-lead connected to and through a normally-open relay-activatable fourth switch to the first circuitry, with the normally-open relay-activatable fourth switch being in circuit between the first unit-input lead and said direct current outlet of the first unit. The normally-open relay-activatable fourth switch is connected to be activated by and upon activation of the first relay-switch coils. Thereby, when there is a voltage on the first relay switch-coils prior to current input through the first unit-input lead from an outside source, the normally-open relay-activatable fourth switch closes whereby the first unit-input lead serves as an output lead as concurrently the normally-closed relay-activatable third switch has opened.

In a still other preferred embodiment, the second unit identical (for all necessary purposes) to the first unit is provided in combination therewith, with the first relay switch-coils of the first unit being connected in downstream electrical flow series with the direct current outlet of the second unit.

The invention may be better understood by making reference to the following drawings and detailed description thereof as follows.

THE FIGURES

FIG. 3 illustrates diagrammatically a circuitry substantially the same features as set-forth in FIG. 1, except additionally including a delayed-resum-demand mechanism for preventing temporary variations or interruptions in activating current or voltage from prematurely bringing about deactivation or the like.

DETAILED DESCRIPTION

As shown in the diagrams, common indicia are used in-so-far as possible, for common elements of the different embodiments, such a 9, 9a, 9b, etc., for example.

Figure 1:
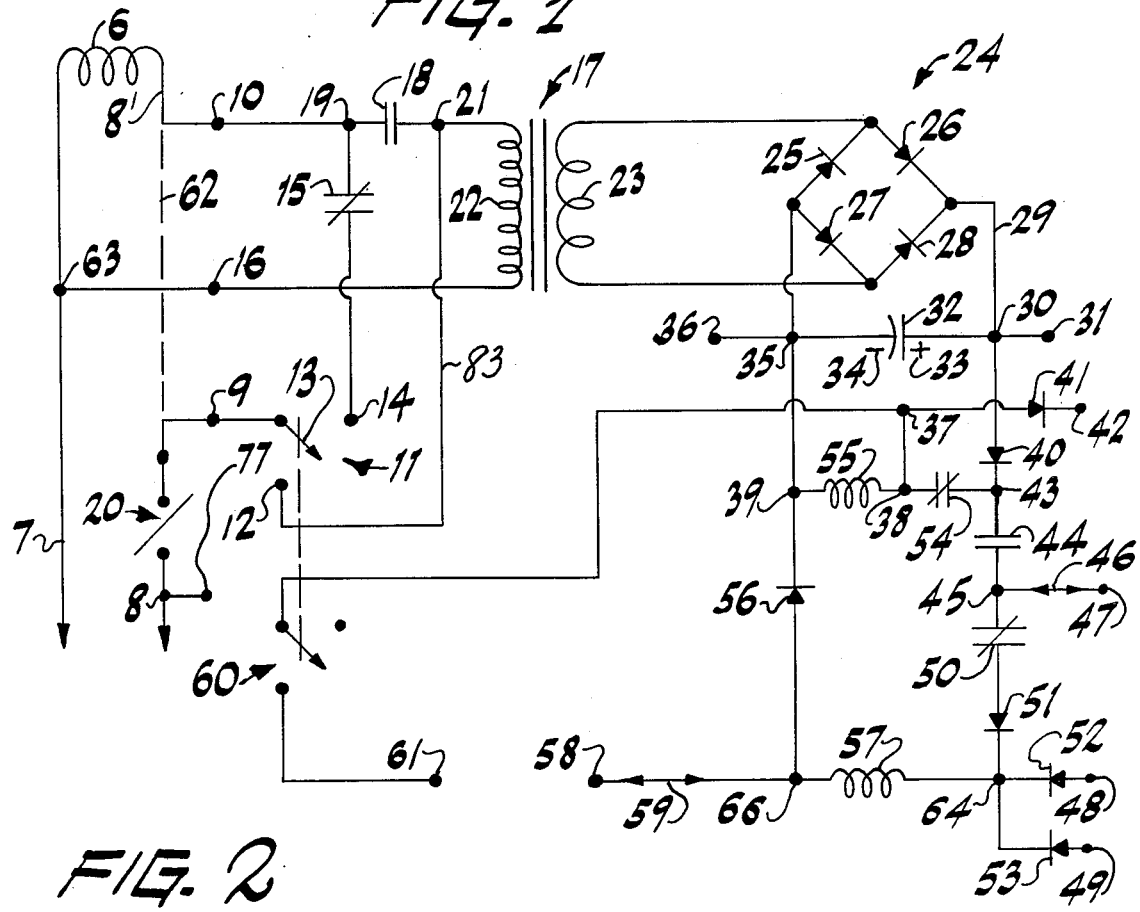
FIG. 1 illustrates diagrammatically a circuitry embodying a typical electrical demand controller unit of the present invention, including illustration of interconnected line voltage lines (wires or leads) and interconnected primarily-controlled load (typifying an electrical motor), embodying the more basic arrangement.

The FIG. 1 embodiment typically has the following elements. Load 6 is powered by electrical leads 7, 8' and 8, the leads 8' and 8 being in substitution for prior now-missing lead portion 62 shown in phantom. Lead 8' connects to contact 10, and lead 8 through switch 20 connects to lead 9 which in turn is connected to switch 11 having its contact 12 and 14 and switch level(arm) 13. Switch 11 is connected from contact 14 to normally-closed switch 15 which switch 15 is relay-activatable by relay coil 55 when activated. Line-side coils 22 of the transformer 17 are connected between contacts 16 and 21, contact 21 being connected to contact 12 by lead 83, and contact 21 being connected to contact 10 through normally-open switch 18 and contact 19, contact 19 being connected to contact 10 and through the switch 15 to contact 14. The switch 18 is activatable to close, by activation of relay coils 55. The contact 77 is a contact utilized in subsequent-figure embodiments. Contact 16 is connected to electrical (source) lead 7 by the lead from contact 63. Elements and contacts, etc. thus-far discussed are located on the high-side of the transformer, with the exception of the activating relay coil 55.

Coil 23 of the low-side of transformer 17 is connected to the bridge rectifier 24, operating through the diodes 25, 26, 27 and 28 to furnish direct current through direct current lead 29 through contact 30; contact 30 is connected—as the positive charge-side—to filter capacitor 32 having its plus side 33 and its opposite negative side 34. Contact 30 is also connected through diode 40 through contact 43 and normally-closed switch 54 to the relay coil 55 to negative-side contact 39. Switch 54 is relay-activatable by and upon activation of relay coil 57. Contact 30 is connected to contact 31, and contact 35 is connected to contact 36. Between the switch 54 and the coil 55, contact 38 is connected to contact 37 to contact 42 through diode 41, and to contact 61 through switch 60. This circuitry is connected to a second circuitry through normally-open switch 44 to contact 45, and the contact 39 through diode 56 to contact 66 of negative terminal 58 to which and from which terminal 58 current may flow in either direction(s) 59. Multidirection 46 is also available for flow of current as between contacts 45 and 47. The contact 45 is connected through normally-closed switch 50 through diode 51 to the contact 64. Contacts 64 and 66 are connected through the relay coil 57. The input contact 48 and 49 are conntected to the contact 64 through diodes 52 and 53.

The switch 20 is in series with the load 6 and power source lead 8. When the switch 20 closes, it connects the load 6 to a line voltage source of electrical power and equipment is turned on. When the operating switch 20 opens, the line voltage is no longer connected nor applied to the load, whereby the load is thus in a turned-off state. In the installed state of the inventive demand controller unit, a connection from lead 8' to lead 8 is made as above-described. When switch 11 closes lever 13 with the normal-operation contact 14, the load 6 is operated in it normal fashion as when no controller is involved, through normally-closed switch 15; in this switch 11 position, there is no current flow through the transformer 17, whereby relay coil 55 remains in a non-activated state unless an equivalent direct current is furnished thereto by a parallel connection of terminal 31 or 61. The relay switch 44 becomes closed by activating coils 55, and the relay switch 50 becomes opened by the activating of coils 55.

It should be noted that the presence of diode 56 prevents flow of current from 39 toward 66 because of the illustrated unidirectional flow, when direct current passes from the contact 38 to contact 39, relative to a negative terminal 58 which is normally negative in polarity or charge. In like manner the diod 41 prevents activation of the relay coil 55 by a positive current on contact 42.

On the other hand, when the lever 13 is in electrical contact with contact 12, line voltage is furnished to the transformer 17, whereby low voltage (typically 17 volts) AC is generated in the low-windings(coils). Through the closed relay switch 54, the relay coil 55 thereby becomes activated to thereby in-turn open switch 15, close switch 18, close switch 44 and open switch 50. The low voltage is typically 24 volts direct-current; note however, that if previous to and continuing at the time of activation of the transformer 17 there was already current and voltage at contact 47, 48, or 49, the thereby activation of the relay coil 57 would already have opened the normally-closed relay switch 54 whereby direct current lead 29 carrying direct current could not activate the relay coil 55 by current from transformer 17. Likewise, when the relay coil 55 is being actuated (energized) by direct current from contact 30, the passage of current through relay coil 57 from contact 48 or 49 will result in an opening of the opening of the relay switch 54 to thereby block current from contact 30 to switch coil 55 thus causing the switch 18 to open and the switch 15 to close and the switch 50 to close and the switch 44 to open. When prior current is furnished from contact 30, subsequent outside voltage (24 VDC) applied to the contact 47 will have no effect because switch 50 is open already, thus blocking flow of current to relay coil 57. Current from contact 30 obviously provides current to contacts 42 and 61 when relay switch 54 is closed and switch 60 is closed, noting that switch 60 is closed when switch 11 closes lever 13 with contact 12. If when relay coil 57 is in a state of activation there is still concurrently current provided through contact 30, upon cessation of activation of relay coil 57, the activation of the relay coil 55 (and initiation of above-noted switches of this coil) will resume. If a concurrent current to contact 47 from an outside source exists when switches 11 or 20 open to deactivate the transformer 17, the current and power through contact 47 will thereupon promptly become transmitted to the thereby now-closed switch 50 to maintain the switch 54 in an open state even if the transformer should promptly become reactivated, until the current from the outside source is removed from the contact 47.

When one unit of this invention is connected in parallel with other units thereof so that all thus-parallel-connected units will function together, activation of the transformer of any one thereof will be the equivalent to the activation of the transformer of the others also, and likewise activation of of the relay coil 57 of one causes the switch 54 of all to open. Thus, to so-connect in parallel, the contacts 36, 31, and 61 and 58 of the respective units are interconnected with the corresponding contacts of the others, whereby all respond the same and as a single unit, to outside activations above-noted.

Figure 2:
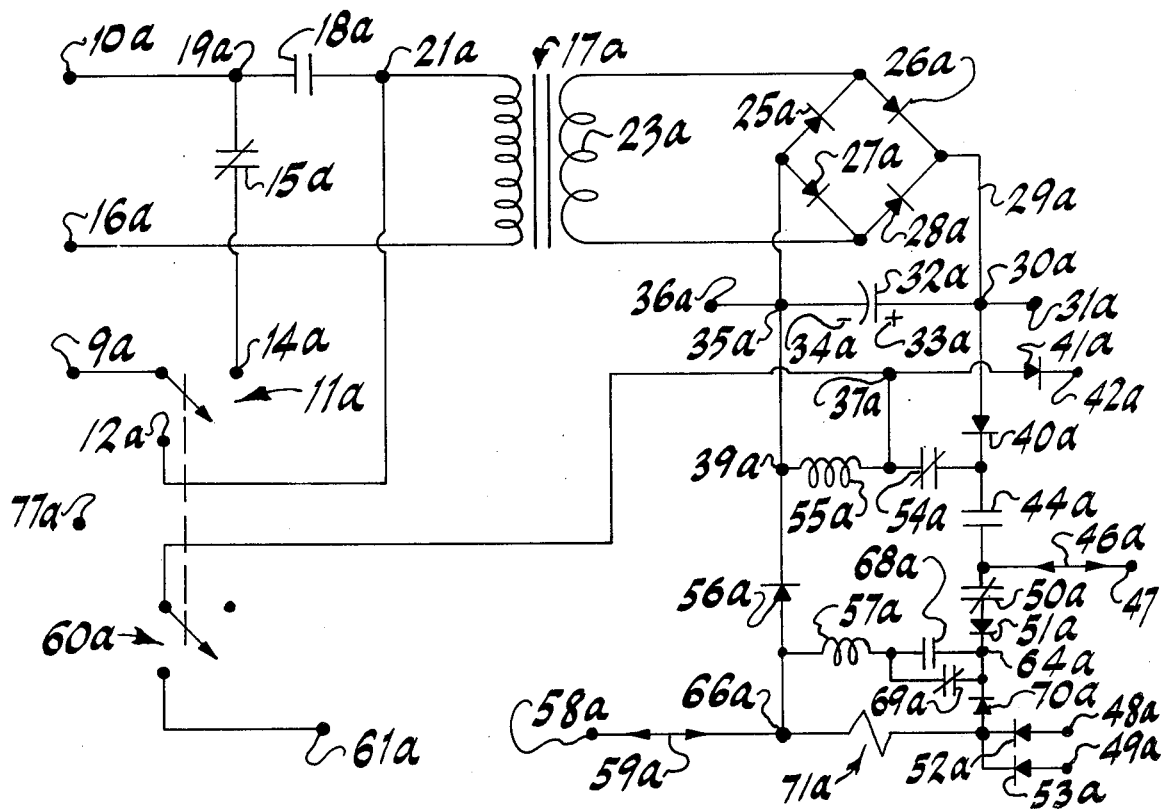
FIG. 2 illustrates diagrammatically a circuitry substantially the same features as set-forth in FIG. 1, except additionally including a time-delay mechanism in circuit of the second circuitry as previously-described.

For the embodiment of FIG. 2, the additional elements are normally-open switch 68a, normally closed switch 69a, diode 70a and time-delay device 71a, of any conventional type, but typically of a thermostatic or thermocouple type heated by power provided thereto to eventually close circuit to thereupon belatedly cause relay switch 68a to close. The normally-closed relay switch 69a becomes opened upon activation of the relay coil 55a (which corresponds to the above-noted relay coil 55 of FIG. 1). Thus, when current is available from any source to the contact 64a, current will be provided to the coil 57a, to open the switch 54a. If the coil 55a is in an activated state prior to providing current to contact 48a or 49a, thereupon when subsequently voltage is applied to 48a or 49a, the relay switch 54a momentarily remains closed and the coil 55a momentarily remains activated until the period of time delay or time-delay device 71a has expired whereupon coil 57a becomes activated to close the switch 68a; the switch 69a is in an open state when being activated by an activated coil 55a.

Figure 3:
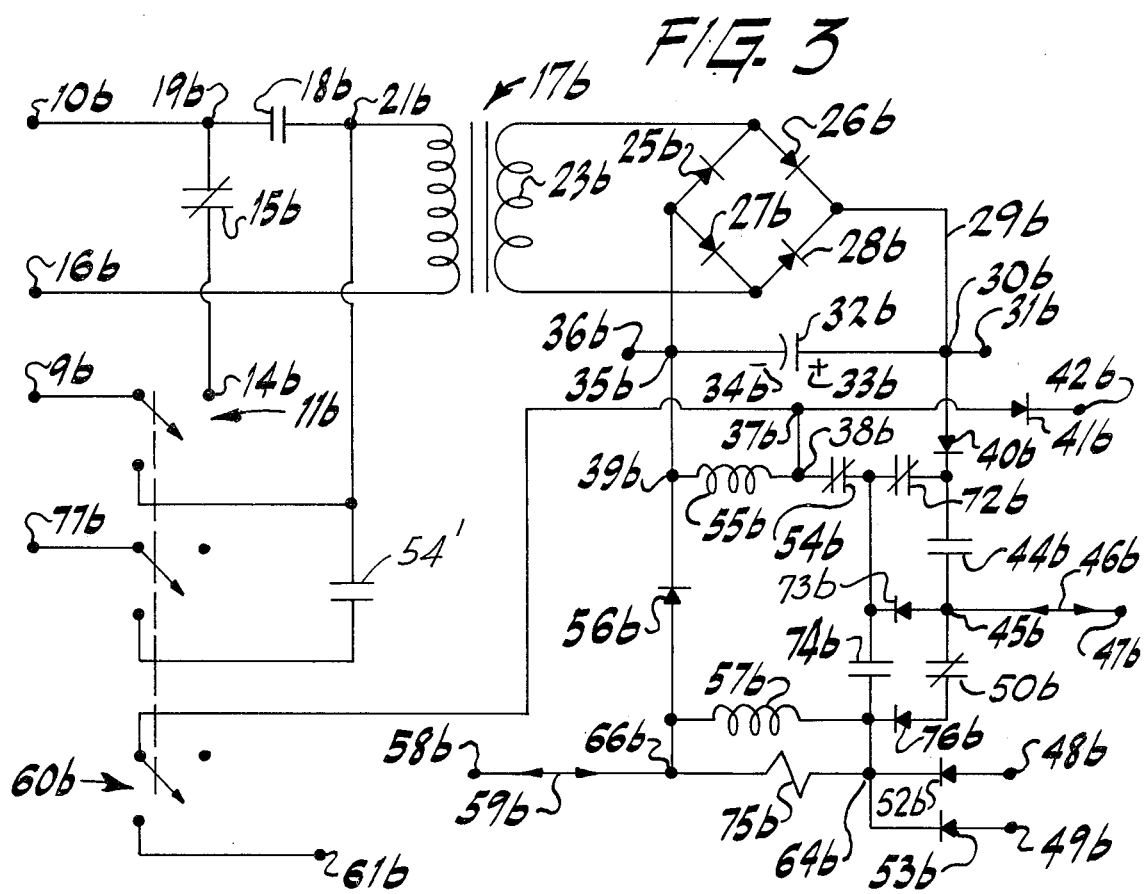

In the FIG. 3 embodiment, the elements in addition, as compared to FIG. 1, are normally-closed relay switch 72b and diode 73b and normally-open relay switch 74b and diode 76b and time-delay relay activator device 75b. When typically the transformer 17b and accordingly the low-side coils 23b are not energized and the coils 57b are energized (closing normally-open relay switch 74b), a short-term deactivation of terminals 48b or 49b by temporary accidental interruptions or variations in voltage do not result in loss of activation of coils 75b because the conventional or other time-delay activator device 75b which operates relay switch 72b and switch 72b and which maintains a substaining temporary voltage and current flow to the coils 57b.

Figure 4:
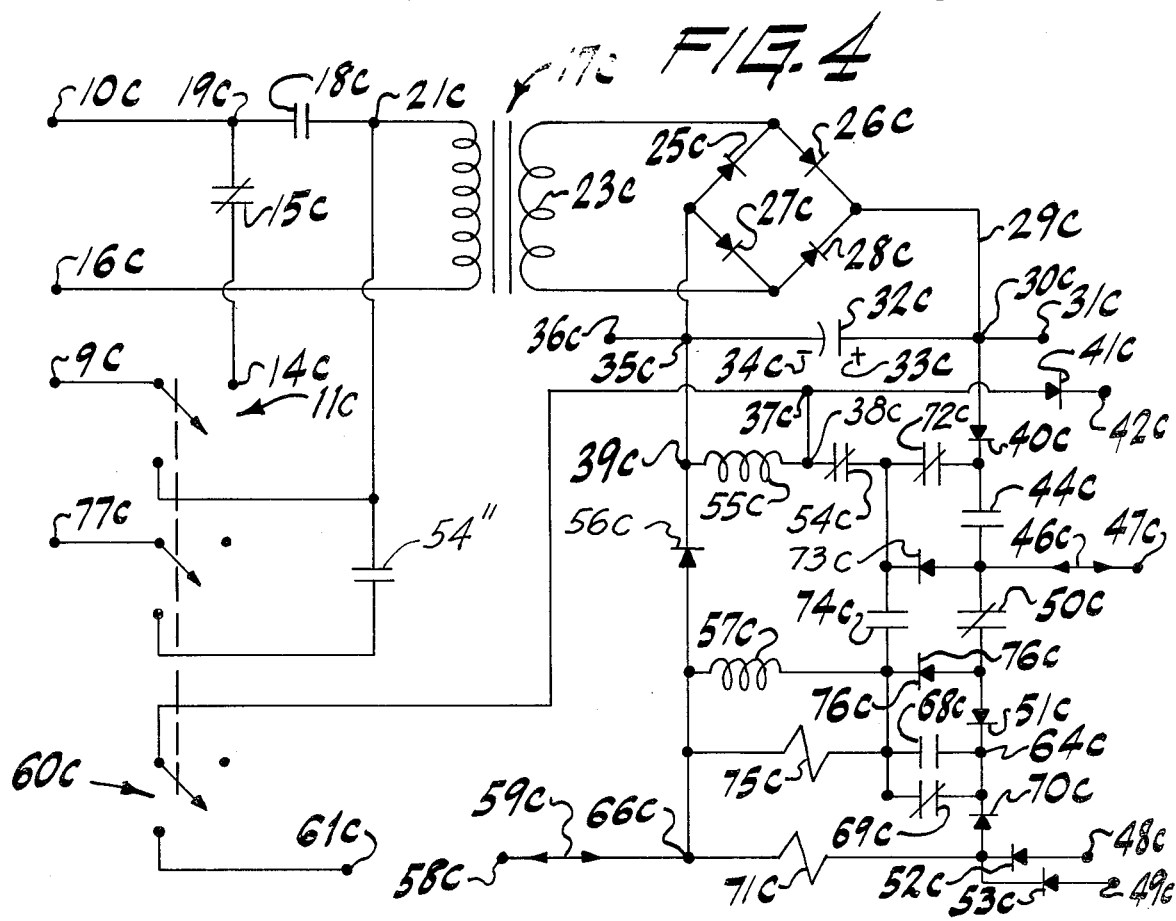
FIG. 4 illustrates a diagrammatic circuitry typically combining the features set-forth in each of the preceding FIGS. 2 and 3.

The FIG. 4 embodiment embodies the features and corresponding elements of each and both FIG. 2 and FIG. 3, and functions the same as above-described.

Figure 5:
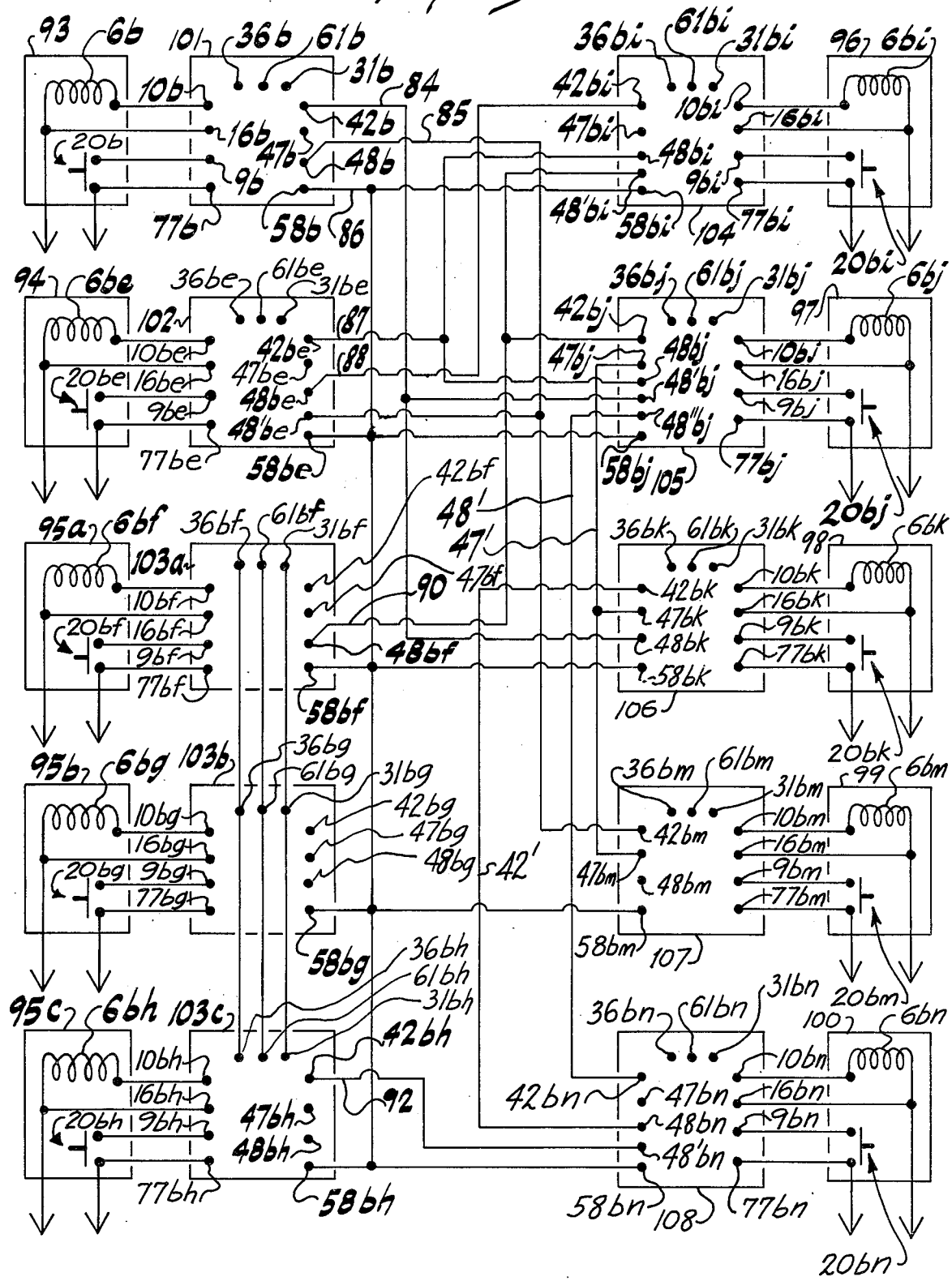
FIG. 5 illustrates a typical diagrammatic illustration of combined circuitries of several units of the types of the preceding Figures.

For the FIG. 5 embodiment, there are provided a plurality of interconnected units 101, 102, 103a, 103b, 103c, 104, 105, 106, 107 and 108, of which unites 103a and 103b, and 103c are connected in parallel, as connected respectively to the controlled loads 93, 94, 95a, 95b, 95c, 96, 97, 98, 99, and 100 respectively. By virtue of prior described elements, it is unnecessary to repeat these basic designation which correspond to those of prior Figures. It is believed sufficient to state the existing relationships which arise from this typical and illustrative arrangement. Accordingly, When unit 93 goes-on, it shuts-off units 97 and 98, and may be shut-down if unit 99 comes-on. When unit 94 goes-on, it shuts-off units 96 and 97, and may be shut-down if either unit 96 or unit 99 comes-on. When any one of units 95a, 95b or 95c goes on, it shuts-off unit 100, and is shut-down by the coming-on of unit 97. When unit 96 goes-on it shuts-off unit 94, becomes shut-down if either unit 94 or unit 97 comes on. When the unit 97 goes-on, it shuts-off each of units 96 and 95a, 95b, and 95c, and is shut-down by the coming on of any one of units 93, 94 or 100. When unit 98 goes on, it shuts-off unit 100, and is shut-down when unit 93 comes-on. When unit 99 comes-on, it cannot start if either of units 97 or 98 is running, and shuts-offs units 93 and 94, and cannot be shut-down by any of the other units. When unit 100 comes on, it shuts-off unit 97, and is shut down by the coming-on of any one or more of units 95a, 95b, 96c, or 97. Unit 98 cannot start if either unit 97 or unit 99 is running and 99 cannot start if either unit 97 or unit 98 is running. These functions result from the illustrated interconnections of various leads and contacts, typically as follow. Lead 84 interconnects contacts 42b and contact 48b and 48bk. Contact 48b is connected by lead 85 to contact 48'be and 42bm. Lead 86 interconnects contact 58b with contacts 58bi, 58be, 58bj, 58bf, 58bk, 58bg, 58bm, 58bh, and 58bn. Lead 87 connects contacts 42be, 48bi, and 48bj. Lead 88 interconnects contacts 48be and 42bi. Lead 90 interconnects 48bf, 48'bi, and 42bj. Lead 92 interconnects contacts 42bh and 48'bn. Lead 42' interconnects contacts 42bk and 48bn. Lead 48' interconnects contacts 42bn and 48"bj. Lead 47' interconnects contacts 47bm, 57bk, and 47bj. Finally it should be noted that the embodiment of FIG. 5 is merely typical of unlimited other variations that are possible but would be impossible to individually illustrate within the space of the present disclosure.

Accordingly, it is within the scope of the present invention to make such variations as would be apparent to a person of ordinary skill, including obvious equivalents for illustrated elements and the like.

I claim:

1. An electrical demand controller device comprising in combination, a first unit comprising: a transformer having high voltage inlet and high voltage outlet leads and having low voltage inlet and low voltage outlet leads; a normally-open relay-activatable first switch being in parallel with one of said high voltage inlet and high voltage outlet leads; first rectifier means having alternating current inlets and a direct current outlet, said direct current outlet being a part of a first circuitry inlet connected operatively to said low voltage inlet and low voltage outlet leads; first relay switch-coils connected serially consecutively with a normally-closed second relay activatable switch, and the second relay activatable switch being connected with inlet leads thereof in series with said direct current outlet, said first relay switch-coils being operatively connected to close said normally-open relay-activatable first switch when activated by current flowing therethrough; and a second circuitry means for an independent flow of current independent of and from the first circuit, and the second circuitry means including a second relay switch-coils connected for electrical current flow therethrough within said second circuitry means, the second relay switch-coils being operatively connected to open said normally-closed relay-activatable second switch and being thereby adapted to break circuit to said first relay switch coils to thereby result in said normally-open relay-activatable first switch to return to or to continue in an open state when said second relay switch-coils are activated by flow of current therethrough; and a first unit-input lead to said second circuitry to and through a normally-closed relay-activatable third switch connected to be activated by and upon activation of said first relay-switch coils, and said first unit-input lead being further connected as an output-lead connected to and through a normally-open relay-activatable fourth switch to said first circuitry with said normally-open relay-activatable fourth switch being in circuit between said first unit-input lead and said direct current outlet of the first unit, said normally-open relay-activatable fourth switch being connected to be activated by and upon activation of said first relay-switch coils whereby said normally-open relay-activatable fourth switch closes when there is a voltage on said first relay switch-coils prior to current input through said first unit input lead from an outside source, with the result that the first unit-input lead is an output lead as concurrently the normally-closed relay-activatable third switch is in an open state.

2. An electrical demand controller device comprising in combination, a first unit comprising: a transformer having high voltage inlet and high voltage inlet and high voltage outlet leads and having low voltage inlet and having low voltage outlet leads; a normally-open relay-activatable first switch being in parallel with one of said high voltage inlet and high voltage outlet leads; first rectifier means having alternating current inlets and a direct current outlet, said direct current outlet being a part of first circuitry inlet connected operatively to said low voltage inlet and low voltage outlet leads; first relay switch-coils connected serially consecutively with a normally-closed second relay activatable switch, and the second relay activatable switch being connected with inlet leads thereof in series with said direct current outlet, said first relay switch-coils being operatively connected to close said normally-open relay-activatable first switch when activated by current flowing therethrough; and a second circuitry means for an independent flow of current independent of and from the first circuit, and the second circuitry means including a second relay switch-coils connected for electric current flow therethrough within said second circuitry means, the second relay switch-coils being operatively connected to open said normally-closed relay-activatable second switch and being thereby adapted to break circuit to said first relay switch coils to thereby result in said normally-open relay-activatable first switch to return to or to continue in an open state when said second relay switch-coils are activated by flow of current therethrough; and a first time-delay means comprising a normally-open first time-delay switch and a first time-delay activator which when activated by current flow thereto causes said normally-open first time-delay switch to close after a delay in time incurred by operation of the first time-delay activator, said first time-delay activator being connected in electrical parallel with said second relay switch-coils of said first unit, and said normally-open first time-delay switch being connected in series flow with said second relay switch-coils of said first unit adapted such that current flow through said second relay switch-coils of said first unit is controlled by said normally-open first time-delay switch, whereby short-period flow of electrical current to said first time-delay activator does not result in a closing of said normally open first time-delay switch when said normally-open first time-delay switch is in an open state.

3. An electrical demand controller device comprising in combination, a first unit comprising a transformer having high voltage inlet and high voltage outlet leads and having low voltage inlet and low voltage outlet leads; a normally-open relay-activatable first switch being in parallel with one of said high voltage inlet and high voltage outlet leads; first rectifier means having alternating current inlets and a direct current outlet, said direct current outlet being a part of a first circuitry inlet connected operatively to said low voltage inlet and low voltage outlet leads; first relay switch-coils connected serially consecutively with a normally-closed second relay activatable switch, and the second relay activatable switch being connected with inlet leads thereof in series with said direct current outlet, said first relay switch-coils being operatively connected to close said normally-open relay-activatable first switch when activated by current flowing therethrough; and a second circuitry means for an independent flow of current independent of and from the first circuit, and the second circuitry means including a second relay switch-coils connected for electrical current flow therethrough within said second circuitry means, the second relay switch-coils being operatively connected to open said normally-closed relay-activatable second switch and being thereby adapted to break circuit to said first relay switch coils to thereby result in said normally-open relay-activatable first switch to return to or to continue in an open state when said second relay switch coils are activated by flow of current therethrough; and a time-delay switch and a time-delay activator maintainable of activation signal for a predetermined minor period of time subsequent to cessation of current flow thereto and for thereby maintaining open said time-delay switch controlled thereby, the time-delay activator being connected in electrical flow series with said second relay switch-coils of the first unit, and the time-delay switch being in electrical flow series with each of said direct current outlet of said first unit and said normally-closed relay-activatable second switch of the first unit whereby a mere temporary cessation for less than the predetermined minor period of time does not result in a premature closing of said normally-open relay-activatable first switch of the first unit.

4. An electrical demand controller device of claim 2, including a second time-delay switch and a second time-delay means comprising a second time-delay activator maintainable of activation signal for a predetermined minor period of time subsequent to cessation of current flow thereto and for thereby maintaining open said second time-delay switch controlled thereby, the second time-delay activator being connected in electrical flow series with said second relay switch-coils of the first unit, and the second time-delay switch being in electrical flow series with each of said direct current outlet of said first unit and said normally-closed relay-activatable second switch of the first unit whereby a mere temporary cessation for less than the predetermined minor period of time does not result in a premature closing of said normally-open relay-activatable first switch of the first unit.

5. An electrical demand controller device of claim 1, including a second unit identical to said first unit, in which said second relay switch-coils of said first unit are connected in series with said direct current outlet of said second unit adapted such that when the normally-open relay activatable first switch of the second unit is in closed state, said normally-open relay-activatable first switch of the first unit returns to or is maintained in an open state.

6. An electrical demand controller device of claim 4, in which said normally-closed relay-activatable second switch of said second unit is connected in current-flow series between the direct current outlet of said second unit and the second relay switch-coils of said first unit adapted such that passage of electrical current through said normally-closed relay-activatable second switch of said first unit ceases upon activation of said second relay switch-coils of the second unit.

7. An electrical demand controller device of claim 1, including a first unit-output lead connected in downstream electrical-flow series with said normally-closed relay-activatable second switch and the first unit-output lead being adapted for connection to a second relay switch-coils of another unit substantially identical to said first unit.

* * * * *